Aug. 6, 1963    W. V. SPURLIN    3,100,053
CAR SHAKER

Filed Feb. 26, 1960    2 Sheets-Sheet 1

INVENTOR.
WILLIAM V. SPURLIN
BY
HIS ATTORNEY

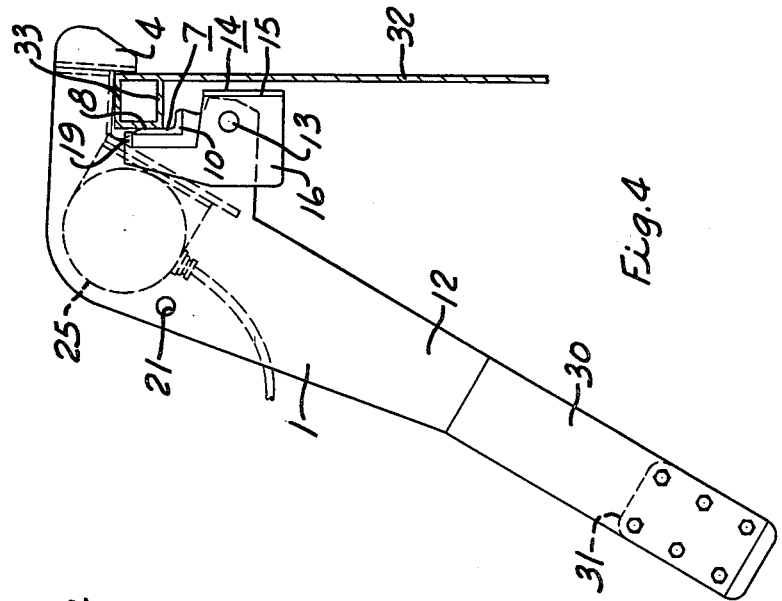
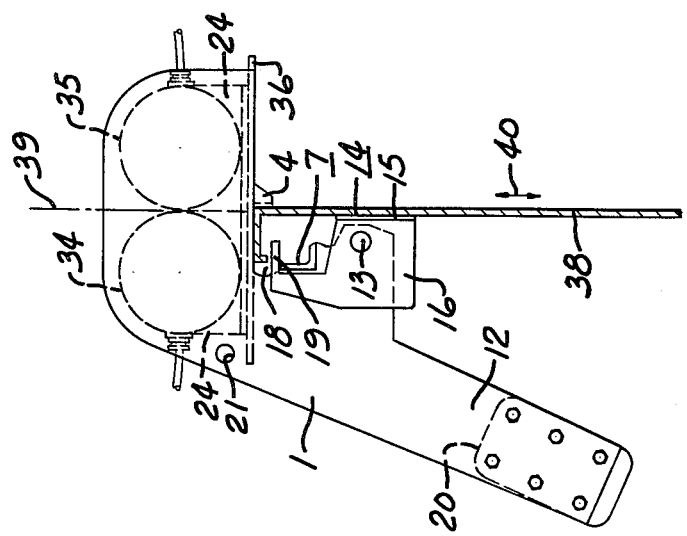
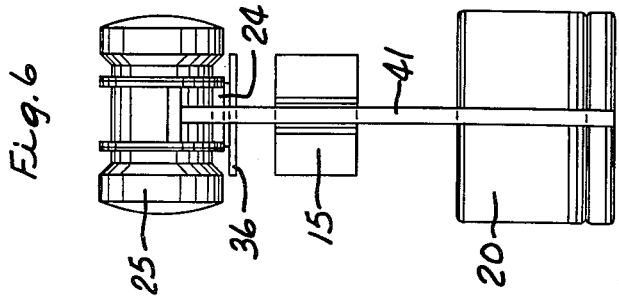

United States Patent Office 3,100,053
Patented Aug. 6, 1963

3,100,053
CAR SHAKER
William V. Spurlin, Indiana, Pa., assignor, by mesne
assignments, to Link-Belt Company, Chicago, Ill., a
corporation of Illinois
Filed Feb. 26, 1960, Ser. No. 11,246
16 Claims. (Cl. 214—83.3)

This invention relates generally to railroad hopper car shakers and more particularly to rotary vibrator car shakers.

Present car shakers present many problems. They are required to be secured at their opposite ends to the car. This involves hooking the device on the rim of the car and then fastening the lower end of the car shaker to the car frame by means of a chain or rod. This fastening must be made taut or it will break loose. When attaching the lower end of the car shaker to the frame a person is required to crawl under the railroad car which is dangerous under any circumstances.

The principal object of this invention is the provision of a car shaker that needs only to be hooked over the rim of the car and then operated to shake the car. The mounting of the car shaker on the car may be performed by automatically lifting the car shaker and dropping it to hook over the rim of the car without movement. The car shaker comprising this invention automatically locks when set onto the car by merely releasing the hoist on it when in position on the car rim. This novel improvement is advantageous regardless of whether the vibratory motor is rotary or reciprocal. It is of course preferable to provide a rotary electrically driven vibrator.

Another object is the provision of a safety catch that automatically prevents the car shaker when operating from vibrating off the car after having been set thereon by a crane. This improvement prevents the car shaker from accidental removal from the car during operation.

Another object is the provision of a car shaker that has a simplified hook, which when raised at a point along its stem, opens the hook to receive the rim of the car and when lowered locks itself in place without aid of an operator to place the car shaker in position.

Another object is the provision of a car shaker having a single rotary vibrator with its rotary axis mounted above the point of lateral engagement of the car shaker with the car.

Another object is the provision of a rotary vibratory car shaker having two rotary vibrators independently driven by oppositely rotating independent motors having substantially the same speed characteristics but with no mechanical connections. These rotary vibrators when operated stay in step with each other and are located to deliver their thrust in line with the side of the car.

Another object is the provision of a car shaker in the form of a hook and having a weight to hold it in operating position.

Another object is the provision of a car shaker in the form of a weighted hook which locks itself in position on the car when lowered and allowed to swing into position.

Other objects and advantages of this invention appear hereinafter in the following description and claims.

The accompanying drawings show for the purpose of exemplification without limiting this invention or the claims thereto, certain practical embodiments illustrating the principles of this invention wherein:

FIG. 4 shows a modified form of car shaker as applied to a heavy flanged car.

FIG. 5 is a view in side elevation showing the dual rotary vibrator motor car shaker.

FIG. 6 is a view in rear elevation of a modified structure showing a single motor on top.

Figure 3:
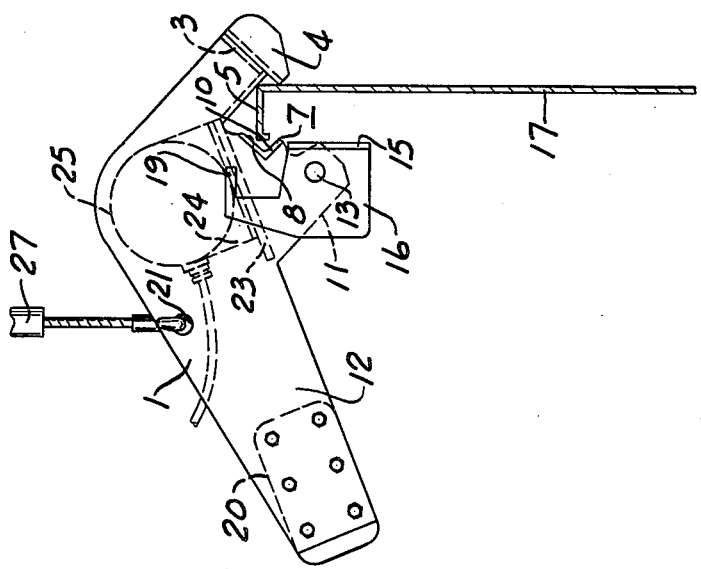
FIG. 3 is a view showing the car shaker being raised to unhook the same from a car.
Figure 1:
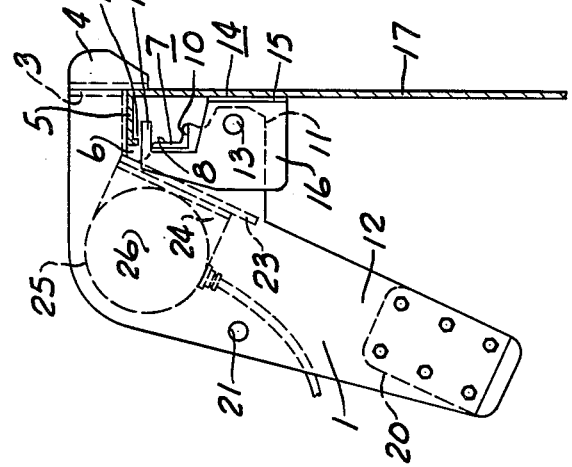
FIG. 1 is a view in side elevation showing the car shaker as applied to a light flanged car.
Figure 2:
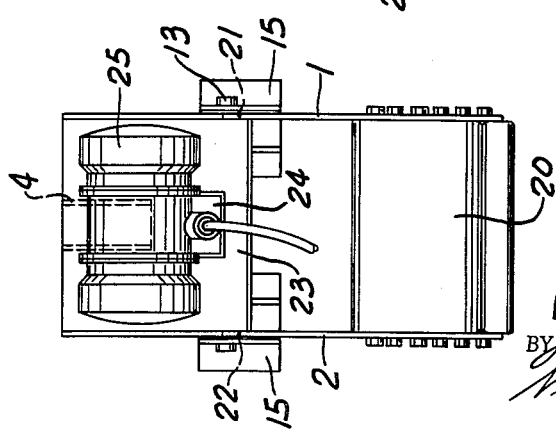
FIG. 2 is a view in rear elevation of the car shaker shown in FIG. 1.

Referring to FIGS. 1 to 3 of the drawings the rotary vibratory car shaker shown is made up of an inverted L shaped bracket hook comprising a pair of parallel plate members 1 and 2 connected together across one end thereof by means of the cross plate 3 which has attached thereto a channel member which forms the nose 4 that extends below the portion of the plates 1 and 2 to provide a bight 5. Inwardly of the bight 5 the plates 1 and 2 curve downwardly forming the knee of the L shaped bracket as indicated at 6 to form the first contact abutment member 7 which is provided with a vertical face 8 and a horizontal face 10. The plates 1 and 2 extend downwardly and outwardly to form the extensions before they return and form the stem or shank portion 12 of the L shaped bracket. Each extension 11 carries a pivot pin 13 on which is pivoted a second contact member 14 that has a pad 15 for engaging the outer surface of the car and is weighted as indicated at 16. The upper portion of the plates forming the contact members 14 pass around the first contact member 7 and are provided with a forwardly extending arm 9 which projects above the position of the contact member 7 and when the pad 15 is in engagement with the outer face 17 of the hopper car the arm 9 extends under the flange or rim of the car 18 and on top of which the bight 5 rests. Thus as shown in FIG. 1 the thin inverted type or light flange car rim 18 has the arm 19 projecting thereunder to lock the car shaker on the car during operation.

The lower end of the stems 12 are connected by the weight member 20 which represents the clamping mass on the hook which is below each of the contacts 7 and 14 which represent force abutments of the car shaker. The car shaker plates 1 and 2 are provided with the holes 21 and 22 into which the sling is looped for the purpose of raising the car shaker.

Another cross plate is indicated at 23 which joins the plates 1 and 2 and forms the base for the mounting housing 24 of the rotary electric vibrator 25 which is an electric motor of preferably alternating current having a shaft with an eccentric weight on each end thereof. This vibratory motor is mounted at the knee of the L shaped bracket. It will be noted that the center of rotation as indicated at 26 in FIG. 1 is above the contact points 7 and 14.

When a sling is inserted in the openings 21 and 22 the hoist indicated at 27 upon raising the car shaker causes the same to pivot around the end of the nose 4 which draws the plates 15 from the outer face 17 of the car and the weight 16 of the contact member 14 being principally on the left of the pivot member 13 swings the locking arm 19 out from under the car flange or rim 18 as shown in FIG. 3. The holes 21 and 22 are selected so that the weight 20 balances the motor 25 and the hole of the hook structure thereby opening the hook to permit it to be automatically raised and lowered by the crane hoist 27. After the car shaker has reached the position as illustrated in FIG. 3 it may be raised higher so as to miss any other cars of different elevations when wheeled under the hook. The mouth of the hook is sufficiently open when in the position as shown in FIG. 3 to compensate for car hopper bodies of varying widths. If the width of the car is materially out of proportion the car shaker may be swung into position laterally. Otherwise this car shaker in combination with the hoist may be remotely controlled without any attendants at the car.

The car shaker as shown in FIG. 4 is the same as that illustrated in FIG. 1 although the stem 12 has been extended as illustrated at 30 and the weight 31 at the end thereof which represents the clamping mass can be made materially lighter than the weight 20 to thereby change the position of the holes 21 and 22. This structure is made to illustrate that the stem of the hook may be made longer as illustrated at 30 without interfering with the principles of the invention. A structure of this character is ordinarily not as advantageous as the structure shown in FIGS. 1 to 3 owing to the fact that more room is required to swing the hook to its open position. Thus the structure of FIGS. 1 to 3 may be operated between the cars in adjacent sidings, whereas the longer structure requires more room.

Another features in the structure shown in FIG. 4 is that the car 32 has a large or heavy box type rim flange 33, the outer surface of which is engaged by the vertical surface 8 of the contact 7 which contact or abutment was not employed in the structure of FIGS. 1 to 3 and in the structure shown in FIG. 4 the contact member 14 is not employed. The downward movement of the stem 12 or 30 is stopped by the vertical section 8 of the contact point 7 engaging the outer face of the box flange 33. The arm 19 also engages or even may be free from engagement of the rim 33 owing to the weight 16. If there is any tendency for the car shaker to jump during its operation the horizontal surface 10 of the contact point 7 will engage the under side of the flange 33 and prevent the car shaker from lifting off of the car. This vibratory motor 25 is also mounted at the knee of the L shaped bracket.

In the structure shown in FIG. 5 the car shaker is substantially the same in design as that shown in FIGS. 1 to 4 with the exception that it has a short stem and is provided with dual electric rotary vibrators 34 and 35 that are mounted on a plate 36 that extends transversely of the car shaker and supports the dual motor housing member 24 to place the rotary vibratory members 34 and 35 very close together. When the hook is in position the vertical line 39 between the rotary motors 34 and 35 is in vertical alignment with the side 38 of the car which is provided with a light flange as indicated at 18. In this instance the rotary vibratory members 34 and 35 are rotated in opposite directions and have similar speed characteristics which cause their eccentric weights to maintain in step when operating to provide a vertical thrust motion as illustrated by the arrow 40. Thus the application of forces in this car shaker are along the maximum moment of the wall 38 of the car and there are no lateral application of forces applied to the car. Of course the side of the car being spaced from the springs which supports the same on its wheels will rock the car as well as shake it up and down.

The structures of FIGS. 1 to 4 employing a single motor provides an application of a force in all directions through the nose, the bight and the contact point of the hook with the side of the car which will not only jostle the car up and down on its springs but rock it sideways.

In the structure shown in FIG. 6 the frame has been reduced to a single central member 41 which is the same shape as the plates 1 and 2 and is provided with the same type of abutment 14 and 7. Here the motor 25 is set on top of the hook in the position similar to that shown at 34 in FIG. 5 and provides a single oscillatory movement in 360° about its shaft. Here again the motor is positioned with its rotary central axis above the point of contact or abutment 7 and 14 and since there is only one motor as against one weight 20 it is necessary to relocate the hoist hold 21.

In each of the structures shown the motors 25 and the motor 34 are on the shank side of the clamp and thus their weight assists the clamping mass on the stem of the hook. Obviously when the motor is down the stem as illustrated in FIGS. 1 to 4 its mass contributes more in assisting the clamping mass at the bottom of the stem.

These motors are designed with their weights to vibrate a car that is full which is the natural period of the swing system owing to the fact that the load in the hopper car as suspended on springs provides in itself a natural period that must be vibrated to effectively empty the car through the hoppers at the bottom thereof. As the car continues to dislodge its commodity the greater the movement of the car. However, the greatest load would be at the time that the car is fully loaded.

When the motor is positioned as illustrated in FIGS. 1 to 4 and as the load decreases the moment of forces must obviously change because the center of the gravity of the mass of the car has shifted and the operating force is a greater distance therefrom. However, the less the mass the greater the current required to operate the car shaker.

In operation the car will not only move up and down but also swing laterally at which time the stem will move up and down. However, the weight of the clamping mass 20 is sufficient to hold the car shaker locked on the car and prevent accidental displacement of the same.

Any control on the speed of the motor also changes the unloading characteristics of the car and may be used to advantage.

I claim:

1. A car shaker consisting of an inverted L shaped bracket hook carrying a vibratory motor means mounted at the knee of said L shaped bracket hook and having a weighted shank, said hook having a nose and a bight therebetween to hook on the rim of a car, said shank extending downwardly and outwardly from the car rim, an abutment extending inwardly from said shank and closely adjacent to and under said bight to form a lock to prevent the vibrations from accidentally dismounting said L shaped bracket hook from the car rim, a reaction surface on the outer end of said abutment to engage the outer car surface under said bight, said nose and said bight and said abutment shaped to form a recess open through a mouth extending from said abutment reaction surface to said nose, the plane of said mouth sloping upwardly when said L shaped bracket hook is in operating position with the car rim in said recess and said nose engaging the inner surface of the car to provide a hook reaction surface and said bight is resting on the rim of the car and said abutment reaction surface is against the outer car surface, said mouth clearing the car rim when said shank is swung outwardly to permit said L shaped bracket hook to be raised vertically off the rim of a car, said shank being weighted to lock the car shaker against outward movement between said reaction surface and the outer car surface during the operation of said vibratory motor means.

2. The car shaker of claim 1 characterized in that said abutment reaction surface includes a vertical face to engage the outer surface of the car and a horizontal face to engage under the car rim when the vibrations accidentally raise the car shaker.

3. The car shaker of claim 2 characterized in that said abutment reaction surface is a shoe means freely pivoted on a horizontal axis below said vibratory motor means and is weighted to suspend its vertical and horizontal surfaces in the same relative position when said shank is swung outwardly and to withdraw them from interference when said L shaped bracket hook is permitted to be raised vertically.

4. The car shaker of claim 2 characterized in that said vibratory motor means is a rotary eccentric vibrator.

5. The car shaker of claim 4 characterized in that the rotary axis of said rotary eccentric vibrator is positioned above said vertical surface of said abutment reaction surface.

6. The car shaker of claim 4 characterized in that said rotary eccentric vibrator is positioned on said shank.

7. The car shaker of claim 1 characterized in that said vibratory motor means is mounted above said L shaped bracket hook nose and bight and closely adjacent thereto.

8. The car shaker of claim 7 characterized in that said vibratory motor means is a pair of rotary vibratory motors mounted on said L shaped bracket hook with their rotary axes mounted on opposite sides of a vertical plane passing through said bight adjacent said nose, said motors providing vertical vibratory impulses.

9. The car shaker of claim 1 characterized in that said weighted shank includes a pocket in the bottom of said shank and weight means in said pocket.

10. The car shaker of claim 1 characterized by a hoist member on said hook secured to said shank below said vibratory motor means and spaced from said abutment, said hoist member disposed relative to the weight distribution of said L shaped bracket hook to swing said abutment out from under said bight when hoisted to a position where it is free for applying or removing said L shaped bracket hook to the rim of a car.

11. The car shaker of claim 10 characterized in that said shank is positioned approximately 18° from the horizontal when said L shaped bracket hook is suspended by said hoist member to apply or remove said L shaped bracket hook member from a car.

12. The car shaker of claim 1 characterized in that said abutment and nose are disposed to position said shank 20° from the vertical when said hook member is reposing on a car.

13. A car shaker consisting of an inverted hook in the form of spaced parallel plates connected together and carrying a vibratory motor means therebetween and having spaced shanks with a depending nose at one end of said connected plates and a bight to rest on the rim of a car, said spaced shanks extending downwardly and outwardly, weight means fastened between said spaced shanks, an abutment extending inwardly from each shank and closely adjacent to and under each bight to form a lock to prevent vibrations from accidentally dismounting said hook from the car rim, a reaction surface on the outer end of each abutment to engage the outer car surface, said nose and bight and abutment shaped to form a recess, each recess being open through a mouth extending from each abutment reaction surface to its respective nose, each mouth sloping upwardly when said hooks are in operating position with the car rim in each of said recesses and each nose engaging the inner surface of the car to provide hook reaction surfaces, and said bights each resting on the rim of the car and said abutment reaction surfaces against the outer car surface, said mouths clearing the car rim when said shanks are swung outwardly to permit said hook to be raised vertically off the rim of the car.

14. A car shaker consisting of an inverted L-shaped bracket hook carrying a vibrator motor means mounted at the knee of said L-shaped bracket hook and having a weighted downwardly extending shank, said hook having a depending nose and a bight between the nose and the shank to hook over and rest on the rim of a car, an abutment extending from said shank and closely adjacent to the underside of said bight to form a recess with said nose to receive a car rim and provide a car engaging surface opposing the car engaging surface of said nose, said shank being weighted sufficiently to apply a car clamping grip through said abutment car engaging surface and said nose to lock the car shaker against relative outward movement between said abutment car engaging surface and the car due to the vibratory car shaking forces of said vibratory motor means.

15. The car shaker of claim 14 characterized in that said vibratory motor means is an eccentric weighted vibrator and is mounted on said shank with its rotary axis above said abutment means.

16. The car shaker of claim 14 characterized in that said weighted shank of said L-shaped bracket hook is a single central member.

References Cited in the file of this patent

UNITED STATES PATENTS

| | | |
|---|---|---|
| 1,774,896 | Miller | Sept. 2, 1930 |
| 2,185,850 | Jackson | Jan. 2, 1940 |
| 2,673,651 | Plant | Mar. 30, 1954 |
| 2,706,566 | Friedh et al. | Apr. 19, 1955 |
| 2,748,959 | Plant | June 5, 1956 |

OTHER REFERENCES

National Car Shaker, May 18, 1955.